(12) United States Patent
Tsubokawa

(10) Patent No.: US 9,108,133 B1
(45) Date of Patent: Aug. 18, 2015

(54) AIR-PERMEABLE WATER NON-PERMEABLE DEVICE

(71) Applicant: Fujikura Rubber Ltd., Tokyo (JP)

(72) Inventor: Hitoshi Tsubokawa, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

(21) Appl. No.: 14/580,647

(22) Filed: Dec. 23, 2014

(30) Foreign Application Priority Data

Jul. 24, 2014   (JP) ................. 2014-150427

(51) Int. Cl.
| | | |
|---|---|---|
| *B01D 53/22* | (2006.01) | |
| *B01D 46/00* | (2006.01) | |
| *F16J 13/00* | (2006.01) | |
| *F16J 13/14* | (2006.01) | |
| *F16K 24/04* | (2006.01) | |

(52) U.S. Cl.
CPC ........ *B01D 46/0005* (2013.01); *B01D 2201/34* (2013.01); *F16J 13/00* (2013.01); *F16J 13/14* (2013.01); *F16K 24/04* (2013.01)

(58) Field of Classification Search
CPC .. B01D 46/0005; B01D 2201/34; F16J 13/00; F16J 13/14; F16K 24/04
See application file for complete search history.

(56) References Cited

U.S. PATENT DOCUMENTS

| | | | | |
|---|---|---|---|---|
| 1,940,601 | A * | 12/1933 | McCrery et al. | 220/203.17 |
| 2,872,499 | A * | 2/1959 | Rowls et al. | 429/89 |
| 3,900,130 | A * | 8/1975 | Andrews | 220/378 |
| 3,951,293 | A * | 4/1976 | Schulz | 215/261 |
| 4,825,905 | A * | 5/1989 | Whitley, II | 137/587 |
| 5,080,001 | A * | 1/1992 | Ishibashi et al. | 454/370 |
| 5,125,428 | A * | 6/1992 | Rauter | 137/199 |
| 5,348,570 | A * | 9/1994 | Ruppert et al. | 96/6 |
| 5,381,563 | A * | 1/1995 | Isabelle et al. | 4/541.5 |
| 5,522,769 | A * | 6/1996 | DeGuiseppi | 454/270 |
| 5,785,390 | A * | 7/1998 | Gold et al. | 301/108.1 |
| 6,193,088 | B1 * | 2/2001 | Vincent et al. | 215/261 |
| 6,889,708 | B2 * | 5/2005 | Krimmer et al. | 137/545 |
| 6,994,621 | B2 * | 2/2006 | Mashiko et al. | 454/270 |
| 7,166,024 | B2 * | 1/2007 | Mashiko et al. | 454/370 |
| 7,357,709 | B2 * | 4/2008 | Zukor et al. | 454/270 |
| 7,546,925 | B1 * | 6/2009 | Zuk, Jr. | 210/406 |
| 8,246,726 | B2 * | 8/2012 | Yano | 96/4 |

(Continued)

FOREIGN PATENT DOCUMENTS

JP   2009078866   4/2009

*Primary Examiner* — Jason M Greene
*Assistant Examiner* — Anthony Shumate
(74) *Attorney, Agent, or Firm* — McCormick, Paulding & Huber LLP

(57) ABSTRACT

An air-permeable water non-permeable device includes a unit including a rubber outer case, a rubber inner case, and an air-permeable water non-permeable sheet sandwiched therebetween; and a housing. The inner case is fitted inside a cylindrical portion of the outer case, the air-permeable water non-permeable sheet being sandwiched between a through-holed base portion of the outer case and a through-holed cylindrical body of the inner case. The through-holed base portion of the outer case faces a mounting through-hole of the housing and the retainer flange portion is externally orientated. The outer case is provided with an insertion guidance small-diameter portion which is not compressed by the retainer inner cylindrical surface and is smaller in diameter than the retainer inner cylindrical surface, and a retainer large-diameter portion which is compressed by the retainer inner cylindrical surface and is larger in diameter than the retainer inner cylindrical surface.

9 Claims, 3 Drawing Sheets

(56) References Cited

U.S. PATENT DOCUMENTS

| | | | |
|---|---|---|---|
| 8,475,575 B2* | 7/2013 | Ono et al. | 96/4 |
| 8,789,557 B2* | 7/2014 | Muller-Riederer et al. | 137/522 |
| 8,814,993 B2* | 8/2014 | Yano | 96/4 |
| 8,858,681 B2* | 10/2014 | Harp | 95/45 |
| 8,999,486 B2* | 4/2015 | Kamikawa | 428/138 |
| 2003/0061938 A1* | 4/2003 | Kunstadt et al. | 96/4 |
| 2005/0000973 A1* | 1/2005 | Sbongk | 220/802 |
| 2007/0125231 A1* | 6/2007 | Thomas et al. | 96/4 |
| 2009/0047890 A1* | 2/2009 | Yano et al. | 454/143 |
| 2009/0084078 A1* | 4/2009 | Furuyama et al. | 55/385.4 |
| 2012/0174789 A1* | 7/2012 | Ono et al. | 96/4 |
| 2014/0224358 A1* | 8/2014 | Brigham | 137/551 |
| 2015/0053282 A1* | 2/2015 | Joos | 137/511 |

* cited by examiner

AIR-PERMEABLE WATER NON-PERMEABLE DEVICE

CROSS REFERENCE TO RELATED APPLICATION

The present invention is related to and claims priority of the following co-pending application, namely, Japanese Patent Application No. 2014-150427 filed on Jul. 24, 2014.

BACKGROUND OF THE INVENTION

1. Field of the Invention

The present invention relates to an air-permeable water non-permeable device, to which an air-permeable water non-permeable unit (assembly), which uses an air-permeable water non-permeable sheet (water-repellent microporous material), is mounted.

2. Description of Related Art

An air-permeable water non-permeable sheet (membrane member/film member), through which liquid is not allowed to pass and air (gas) is allowed to pass, is known in the art, for example, as a PTFE (polytetrafluoroethylene) microporous membrane. Such an air-permeable water non-permeable sheet can be provided, for example, to close up a through-hole in a housing, defining a space requiring ventilation (ventilation-requiring space), to be used for allowing gas to flow therethrough between this ventilation-requiring space and an external space while preventing liquid from permeating into the ventilation-requiring space (Japanese Unexamined Patent Publication No. 2009-78866).

In Japanese Unexamined Patent Publication No. 2009-78866, a special structure is proposed in the case where an air-permeable water non-permeable sheet is fixed around the periphery of a housing through-hole. On the other hand, another type of air-permeable water non-permeable sheet is also known in the art in which the air-permeable water non-permeable sheet is retained by a unit that is separate from a housing and the unit is mounted (detachably attached) onto a housing through-hole, without directly fixing the air-permeable water non-permeable sheet onto the periphery of the housing through-hole.

However, in a type of air-permeable water non-permeable device of the related art in which an air-permeable water non-permeable sheet is retained by a unit that is separate from a housing and the unit is mounted onto a housing through-hole, the balance between the mounting operability and the stability (ability to prevent the unit from falling out) upon the unit (to which the air-permeable water non-permeable sheet is fixed) being mounted is poor, so that there is a problem with the unit easily falling out in the case where the unit can be easily mounted, and with the unit being difficult to mount in the case where the unit does not easily fall out.

SUMMARY OF THE INVENTION

The present invention provides an air-permeable water non-permeable device which is an air-permeable water non-permeable unit that is a type in which an air-permeable water non-permeable sheet is retained by a unit that is separate from a housing, and is configured of a rubber outer case, a rubber inner case, and an air-permeable water non-permeable sheet, and can be easily mounted into a mounting through-hole of a housing while obtaining a sufficient mounting strength.

Furthermore, the present invention provides an air-permeable water non-permeable device in which the component parts which are mounted into a mounting through-hole of an air-permeable water non-permeable unit do not easily fall out.

According to an aspect of the present invention, an air-permeable water non-permeable device is provided, including an air-permeable water non-permeable unit including a rubber outer case, a rubber inner case, and an air-permeable water non-permeable sheet which is sandwiched in between the outer case and the inner case; and a housing provided with a mounting through-hole, in which the air-permeable water non-permeable unit is mounted. The outer case includes a cylindrical portion, a retainer flange portion extending radially outwards from one end of the cylindrical portion, and a through-holed base portion having a ventilation hole formed therethrough, the through-holed base portion extending radially inwards from the other end of the cylindrical portion. The inner case is fitted inside the cylindrical portion of the outer case and is formed as a through-holed cylindrical body including a ventilation hole, the air-permeable water non-permeable sheet being sandwiched between the through-holed base portion and the through-holed cylindrical body. The mounting through-hole includes a retainer inner cylindrical surface, which is smaller in diameter than the remainder of the mounting through-hole, at an intermediate portion with respect to a central axis direction thereof. The air-permeable water non-permeable unit is inserted into the mounting through-hole with the through-holed base portion of the outer case facing toward the mounting through-hole and the retainer flange portion orientated toward an external position with respect to the housing. The outer case is provided with an insertion guidance small-diameter portion which is not compressed by the retainer inner cylindrical surface and is smaller in diameter than the retainer inner cylindrical surface, and a retainer large-diameter portion which is compressed by the retainer inner cylindrical surface and is larger in diameter than the retainer inner cylindrical surface, in that order in a direction of insertion of the air-permeable water non-permeable unit into the mounting through-hole.

It is desirable for the mounting through-hole of the housing to include a large-diameter inner cylindrical surface, which is larger in diameter than that of the retainer inner cylindrical surface, at the fully-inserted side, with respect to the insertion direction of the outer case, of the retainer inner cylindrical surface. The retainer large-diameter portion, of the outer case, which is inserted to a fully-inserted position after being compressed by the retainer inner cylindrical surface fit-engages with the large-diameter inner cylindrical surface in a compressed state.

It is desirable for the mounting through-hole of the housing to include a tapered inner cylindrical surface at an insertion-opening side of the retainer inner cylindrical surface, and for the outer case to include an expanding outer cylindrical surface which fit-engages with the tapered inner cylindrical surface.

It is desirable for a large-diameter inner cylindrical surface which overlaps the retainer large-diameter portion which respect to positions thereof in an central axial direction to be formed on an inner cylindrical surface of the cylindrical portion of the outer case, and a large-diameter outer cylindrical surface which fit-engages with the large-diameter inner cylindrical surface to be formed on an outer cylindrical surface of the inner case, in a state where the inner cylindrical surface of the cylindrical portion of the outer case and the outer cylindrical surface of the inner case are fit-engaged with each other.

It is desirable for a large-diameter inner cylindrical surface which overlaps the retainer large-diameter portion which respect to positions thereof in a central axial direction to be formed on an inner cylindrical surface of the cylindrical portion of the outer case. A large-diameter outer cylindrical surface, which is larger in diameter in a free state than the large-diameter inner cylindrical surface of the outer case and reduces in diameter upon being fitted in the large-diameter inner cylindrical surface, is formed on an outer peripheral surface of the inner case.

It is desirable for the inner cylindrical surface of the cylindrical portion of the outer case to be provided with a small-diameter inner cylindrical surface, which is smaller in diameter than that of the large-diameter inner cylindrical surface and formed at one end of the large-diameter inner cylindrical surface, and for the inner case to be provided with a small-diameter outer cylindrical surface which is larger in diameter in a free state than the small-diameter inner cylindrical surface, wherein the diameter of the small-diameter outer cylindrical surface is reduced upon being fitted in the small-diameter inner cylindrical surface.

It is desirable for the ventilation hole of the inner case to include a large-diameter ventilation hole at a side thereof that faces the air-permeable water non-permeable sheet, and a small-diameter ventilation hole at a side thereof that faces an external space of the housing, wherein the small-diameter ventilation hole is smaller in diameter than that of the large-diameter ventilation hole.

It is desirable for the inner case to be inserted into the cylindrical portion of the outer case from a side thereof at an external space of the housing.

According to an air-permeable water non-permeable device of the present invention, an air-permeable water non-permeable unit that is configured of two rubber components (i.e., a rubber outer case and a rubber inner case), and an air-permeable water non-permeable sheet, can be easily mounted into a mounting through-hole of a housing while obtaining a sufficient mounting strength. Furthermore, the configuration of the air-permeable water non-permeable unit is simple, while having superior moldability of the rubber components, superior assembling ability, and superior retention of the air-permeable water non-permeable sheet.

BRIEF DESCRIPTION OF THE DRAWINGS

The present invention will be discussed below in detail with reference to the accompanying drawings, in which.

DESCRIPTION OF THE EMBODIMENTS

Figure 1A:
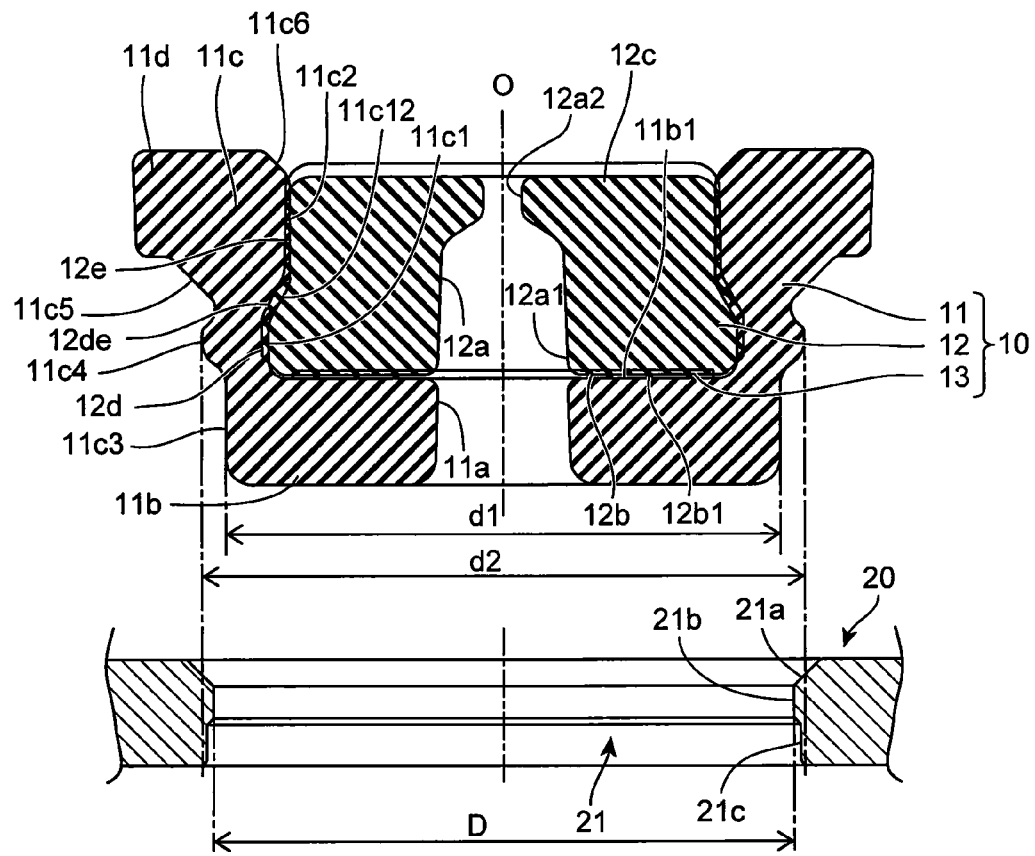
FIG. 1A is a cross-sectional view, of an embodiment of an air-permeable water non-permeable device according to the present invention, of an assembled air-permeable water non-permeable unit before being mounted into a housing mounting through-hole.
Figure 1B:
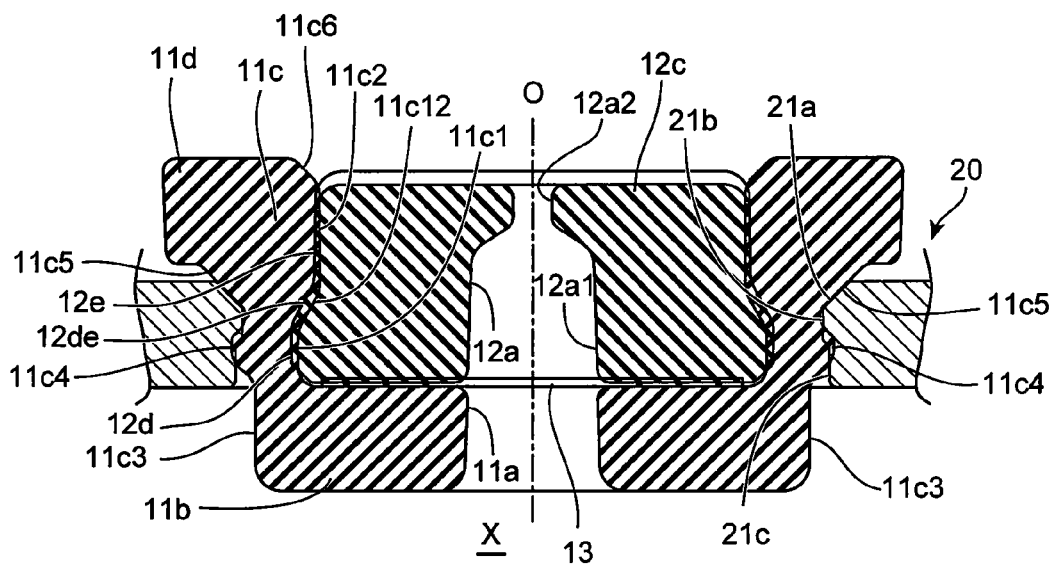
FIG. 1B is a cross-sectional view, of the embodiment of the air-permeable water non-permeable device shown in FIG. 1A, of the assembled air-permeable water non-permeable unit after being mounted into a housing mounting through-hole.

FIGS. 1A and 1B show an air-permeable water non-permeable unit 10 and a housing 20, which defines a ventilation-requiring space X. The air-permeable water non-permeable unit 10 is mounted (detachably attached) in a mounting through-hole 21, which is formed in the housing 20. Each component part of the air-permeable water non-permeable unit 10 and the lower rail 21 have a rotationally symmetrical shape about a central axis O.

The air-permeable water non-permeable unit 10 is configured of an outer case 11 and an inner case 12, which are both made of rubber (for example, a fluoroelastomer, H-NBR), and an air-permeable water non-permeable sheet (film) 13 which is sandwiched in and held between the outer case 11 and the inner case 12.

Figure 2A:
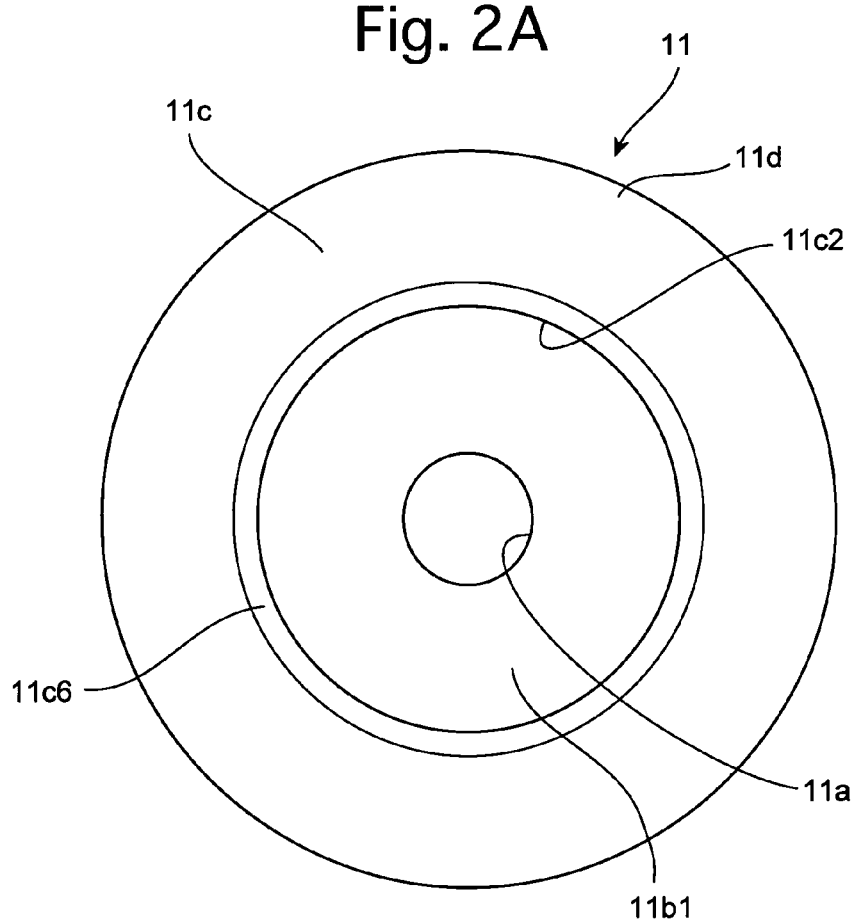
FIG. 2A is a plan view of an outer case of the air-permeable water non-permeable unit.
Figure 2B:
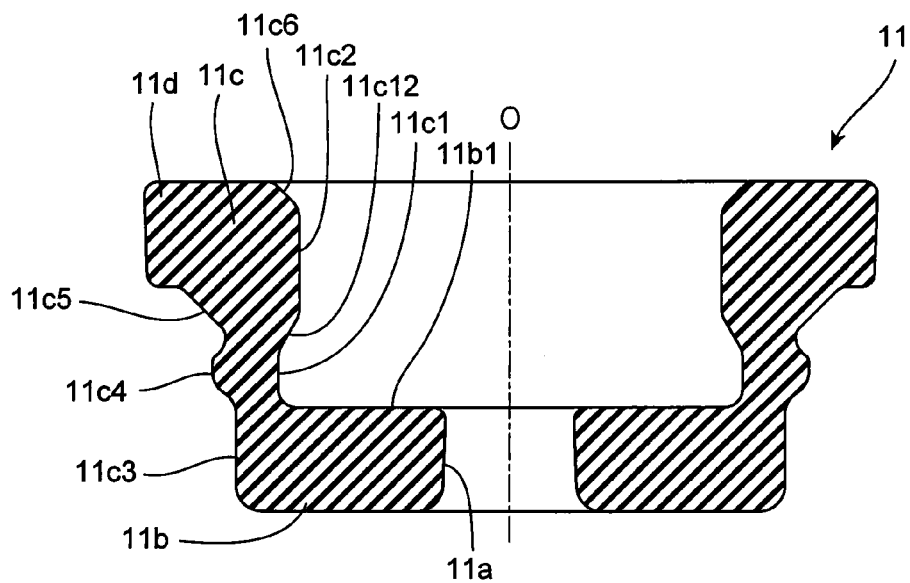
FIG. 2B is a vertical cross-sectional view of the outer case of the air-permeable water non-permeable unit.

As shown in FIGS. 2A and 2B, the outer case 11 includes a cylindrical portion 11$c$, a through-holed base portion 11$b$ which extends radially inwards from an end of the cylindrical portion 11$c$ (the lower end as shown in FIGS. 1A, 1B and 2B), and a retainer flange portion 11$d$ which extends (projects) radially outwards from the other end of the cylindrical portion 11$c$ (the upper end as shown in FIGS. 1A, 1B and 2B). A ventilation hole 11$a$ is formed through the through-holed base portion 11$b$ at a position on the central axis O of the cylindrical portion 11$c$. The surface on the inner case 12 side of the through-holed base portion 11$b$ (the upper side of the through-holed base portion 11$b$ in FIGS. 1A and 1B) lies on a plane that is orthogonal to the central axis O and serves as a sheet sandwiching surface 11$b$1.

The inner surface of the cylindrical portion 11$c$ is configured of a tapered inner cylindrical surface (counterbore) 11$c$6 portion, which inwardly decreases in diameter, formed at an end portion (upper end as viewed in FIGS. 1A, 1B and 2B) at the opposite end from that of the through-holed base portion 11$b$, a small-diameter inner cylindrical surface 11$c$2 formed at one end of the tapered inner cylindrical surface 11$c$6, an expanding inner cylindrical surface 11$c$12 which gradually (smoothly) outwardly increases in diameter from the small-diameter inner cylindrical surface 11$c$2 toward the through-holed base portion 11$b$, and a large-diameter inner cylindrical surface 11$c$1 which has a larger diameter than that of the small-diameter inner cylindrical surface 11$c$2, formed in that order from the upper end as viewed in FIGS. 1A, 1B and 2B.

An insertion guidance small-diameter portion 11$c$3, constituting the outer peripheral surface of the through-holed base portion 11$b$, is formed on the outer peripheral surface of the cylindrical portion 11$c$. A retainer large-diameter portion 11$c$4 is formed on the outer peripheral surface of the cylindrical portion 11$c$ at an area (an area overlapping at a position with respect to the axial direction) corresponding to an area at which the large-diameter inner cylindrical surface 11$c$1 is formed. An expanding outer cylindrical surface 11$c$5, which outwardly increases in diameter toward the outer peripheral surface of the retainer flange portion 11$d$, is formed at an area (an area overlapping at a position with respect to the axial direction) corresponding to an area at which the small-diameter inner cylindrical surface 11$c$2 is formed.

Figure 3A:
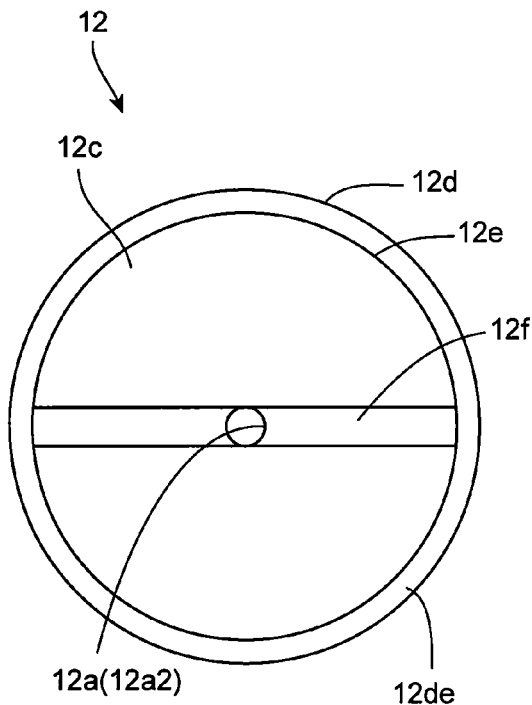
FIG. 3A is a plan view of an inner case of the air-permeable water non-permeable unit.
Figure 3C:
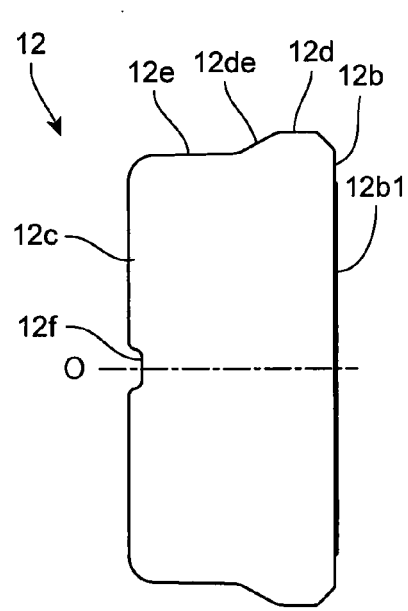
FIG. 3C is a side elevational view of the inner case of the air-permeable water non-permeable unit.
Figure 3B:
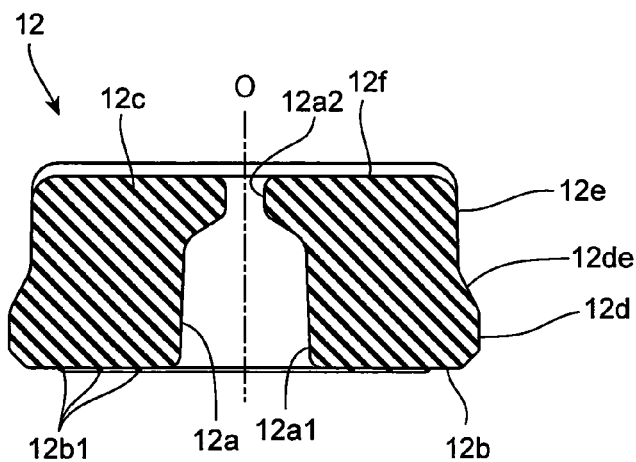
FIG. 3B is a vertical cross-section view of the inner case of the air-permeable water non-permeable unit.

The inner case 12, shown in FIGS. 3A through 3C, is configured of a through-holed cylindrical body 12$c$ provided with a ventilation hole 12$a$, corresponding to the ventilation hole 11$a$ of the outer case 11, along the central axis O. The ventilation hole 12$a$ is provided with a large-diameter ventilation hole 12$a$1 on a side corresponding to the ventilation hole 11$a$ of the outer case 11, and a small-diameter ventilation hole 12$a$2 on a side facing an external space on the opposite side to that of the ventilation hole 11$a$. The through-holed cylindrical body 12$c$ of the inner case 12 is provided with a plurality of concentric annular projections 12$b$1 (projections each having a semicircular cross section) formed on a sheet sandwiching surface 12$b$ (outer-end surface facing the through-holed base portion 11*b* (sheet sandwiching surface 11*b*1) of the outer case 11) on the large-diameter ventilation hole 12*a*1 side.

Furthermore, the outer peripheral surface of the inner case 12 (through-holed cylindrical body 12*c*) is provided with a large-diameter outer cylindrical surface 12*d*, corresponding to the large-diameter inner cylindrical surface 11*c*1 of the outer case 11; and a small-diameter outer cylindrical surface 12*e*, having a reduced diameter via a tapered outer cylindrical surface 12*de*, corresponding to the small-diameter inner cylindrical surface 11*c*2. The outer diameter of the large-diameter outer cylindrical surface 12*d* in a free state is slightly larger in diameter (e.g., approximately 105% through 110% larger) than the inner diameter of the large-diameter inner cylindrical surface 11*c*1 in a free state, and the outer diameter of the small-diameter outer cylindrical surface 12*e* in a free state is slightly larger (e.g., approximately 105% through 110% larger) than the inner diameter of the small-diameter inner cylindrical surface 11*c*2 in a free state. Furthermore, the outer diameter of the large-diameter outer cylindrical surface 12*d* in a free state is sufficiently larger (e.g., approximately 110% through 120%) than the inner diameter of the small-diameter inner cylindrical surface 11*c*2 in a free state. FIGS. 1A and 1B depict the shapes of the outer case 11 and the inner case 12 before they are elastically deformed, and the overlapping portions thereof show the deformation margins therebetween.

Furthermore, the through-holed cylindrical body 12*c* of the inner case 12 is provided with a groove 12*f* that is formed across the entire diameter thereof (in a radial direction) in the surface thereof that is opposite to that of the sheet sandwiching surface 12*b*. The width of the groove 12*f* is dimensionally substantially the same as the diameter of the small-diameter ventilation hole 12*a*2. The groove 12*f* has an effect of ensuring an air channel between the small-diameter ventilation hole 12*a*2 and an external space even if some kind of flat member comes in contact with the external surface of the inner case 12, and also serves to distinguish between the external and internal sides of the inner case 12.

The air-permeable water non-permeable sheet 13 can be, for example, a PTFE (polytetrafluoroethylene) sheet known under the brand name of GORE-TEX® which is air permeable while being water non-permeable. Such a PTFE sheet is known to have various types of air-permeable water non-permeable properties (levels and capabilities) in accordance with usage, one type of which is selected and used.

The mounting through-hole 21 of the housing 20 is provided with a tapered inner cylindrical surface 21*a* (at an insertion-opening side of the mounting through-hole 21), which guides a rounded portion that connects the through-holed base portion 11*b* with the insertion guidance small-diameter portion 11*c*3 of the outer case 11; a retainer inner cylindrical surface 21*b* corresponding to the insertion guidance small-diameter portion 11*c*3 of the outer case 11; and a large-diameter inner cylindrical surface 21*c*, which has a larger diameter than the retainer inner cylindrical surface 21*b*. An outer diameter d1 of the insertion guidance small-diameter portion 11*c*3, in a free state, is either the same or slightly smaller than an inner diameter D of the retainer inner cylindrical surface 21*b*, so that the insertion guidance small-diameter portion 11*c*3 can be easily inserted and removed from the retainer inner cylindrical surface 21*b*. An outer diameter d2 of the retainer large-diameter portion 11*c*4, in a free state, is larger than the inner diameter D of the retainer inner cylindrical surface 21*b* of the housing 20. In other words, d1≤D<d2. Since the retainer inner cylindrical surface 21*b* undertakes, together with the retainer large-diameter portion 11*c*4, a retaining function and an air-tightness function, it is desirable for the inner diameter of the retainer inner cylindrical surface 21*b* to have a slightly smaller diameter than the outer diameter d2 of the retainer large-diameter portion 11*c*4 in a free state.

In the illustrated embodiment, although the inner cylindrical diameter of the small-diameter inner cylindrical surface 11*c*2 has a constant diameter, the small-diameter inner cylindrical surface 11*c*2 can alternatively have a tapered inner cylindrical surface that gradually (smoothly) decreases in diameter toward the through-holed base portion 11*b*.

The air-permeable water non-permeable device of the illustrated embodiment is provided by assembling the outer case 11, the inner case 12 and the air-permeable water non-permeable sheet 13 as the air-permeable water non-permeable unit 10, and thereafter mounting the air-permeable water non-permeable unit 10 in the mounting through-hole 21 of the housing 20.

In order to assemble the air-permeable water non-permeable unit 10, in a state where the air-permeable water non-permeable sheet 13 is placed onto the sheet sandwiching surface 11*b*1 of the outer case 11, the inner case 12 is inserted into the cylindrical portion 11*c* of the outer case 11 from the sheet sandwiching surface 12*b* side. When the inner case 12 is inserted into the outer case 11, first the large-diameter outer cylindrical surface 12*d* reduces in diameter by receiving a compression force from the tapered inner cylindrical surface 11*c*6, and thereafter receives a compression force from the small-diameter inner cylindrical surface 11*c*2 and is inserted therein in a compressed state. Conversely, the outer case 11 expands in diameter by the small-diameter inner cylindrical surface 11*c*2 receiving an expansion force from the large-diameter outer cylindrical surface 12*d*. Upon the inner case 12 being further inserted into the outer case 11, the large-diameter outer cylindrical surface 12*d* passes through the small-diameter inner cylindrical surface 11*c*2 and fits into the large-diameter inner cylindrical surface 11*c*1, and the small-diameter outer cylindrical surface 12*e* fits into the small-diameter inner cylindrical surface 11*c*2. The large-diameter outer cylindrical surface 12*d* and the large-diameter inner cylindrical surface 11*c*1 are fitted into/onto each other in an intimate contacting state while mutually receiving a compression force and an expanding force while slightly reducing and enlarging the diameters thereof, respectively.

Similarly, the small-diameter outer cylindrical surface 12*e* and the small-diameter inner cylindrical surface 11*c*2 are fitted into/onto each other in an intimate contacting state while mutually receiving a compression force and an expanding force while slightly reducing and enlarging the diameters thereof, respectively.

Furthermore, the inner case 12 and the outer case 11 are held with the air-permeable water non-permeable sheet 13 elastically clasped between the sheet sandwiching surface 12*b* (and the concentric annular projections 12*b*1) and the sheet sandwiching surface 11*b*1 due to a wedging action via the tapered outer cylindrical surface 12*de*, which is formed between the large-diameter outer cylindrical surface 12*d* and the small-diameter outer cylindrical surface (constant diameter outer cylindrical surface) 12*e*, and the expanding inner cylindrical surface 11*c*12, which is formed between the large-diameter inner cylindrical surface 11*c*1 and the small-diameter inner cylindrical surface 11*c*2.

FIGS. 1A and 1B show the air-permeable water non-permeable unit 10 with the outer case 11, the inner case 12 and the air-permeable water non-permeable sheet 13 assembled. In this assembled state, the air-permeable water non-permeable sheet 13 is sandwiched in between the sheet sandwiching surface 11b1 of the outer case 11 and the sheet sandwiching surface 12b (concentric annular projections 12b1) of the inner case 12, and the concentric annular projections 12b1 hold the air-permeable water non-permeable sheet 13 while being elastically deformed. It should be noted that although the number of the concentric annular projections 12b1 is three in the illustrated embodiment (see FIG. 3B), the number thereof can be any other desired number.

Furthermore, the large-diameter inner cylindrical surface 11c1 of the outer case 11 is pressed in a radially outward direction by the large-diameter outer cylindrical surface 12d of the inner case 12 so that the cylindrical portion 11c increases in diameter by elastically deforming, thereby increasing the engagement strength between the outer case 11 and the inner case 12 (between the large-diameter inner cylindrical surface 11c1 and the large-diameter outer cylindrical surface 12d), and thereby improving the retaining action thereof. When the large-diameter inner cylindrical surface 11c1 is pressed radially outwards (and increases in diameter), the outer diameter of the retainer large-diameter portion 11c4 increases with the increase in diameter of the cylindrical portion 11c.

Accordingly, with the air-permeable water non-permeable unit 10 in an assembled state as described above, with the through-holed base portion 11b of the outer case 11 facing toward the mounting through-hole 21 and the retainer flange portion 11d orientated toward an outward position with respect to the housing 20, the outer case 11 is inserted into the mounting through-hole 21 from the through-holed base portion 11b. Since the outer diameter d1 of the insertion guidance small-diameter portion 11c3 (through-holed base portion 11b) is smaller than the inner diameter D of the retainer inner cylindrical surface 21b of the mounting through-hole 21, so that the through-holed base portion 11b is never compressed by the retainer inner cylindrical surface 21b (mounting through-hole 21), the retainer large-diameter portion 11c4 can be inserted without any resistance until coming into contact with the retainer inner cylindrical surface 21b, and the air-permeable water non-permeable unit 10 can be securely held inside the mounting through-hole 21 via the fitting relationship between the through-holed base portion 11b and the retainer inner cylindrical surface 21b.

After the insertion guidance small-diameter portion 11c3 has been inserted into the retainer inner cylindrical surface 21b, an inclined portion of the retainer large-diameter portion 11c4 contacts the tapered inner cylindrical surface 21a, and the retainer large-diameter portion 11c4 is gradually compressed by the tapered inner cylindrical surface 21a so that the outer case 11 continues to be further inserted while reducing in diameter. The cylindrical surface, which appears as a flat portion in a cross-section view, of the retainer large-diameter portion 11c4 thereafter contacts the retainer inner cylindrical surface 21b, passes through the retainer inner cylindrical surface 21b while being compressed thereby, and thereafter arrives at the large-diameter inner cylindrical surface 21c. The retainer large-diameter portion 11c4 tries to return to a natural state (initial state) by expanding its diameter within the large-diameter inner cylindrical surface 21c. However, since the inner diameter of the large-diameter inner cylindrical surface 21c is slightly smaller than the outer diameter d1 of the retainer large-diameter portion 11c4, the retainer large-diameter portion 11c4 contacts the large-diameter inner cylindrical surface 21c and is held thereby in a slightly compressed state. Furthermore, in this state, the expanding outer cylindrical surface 11c5 of the outer case 11 is elastically contacted by the tapered inner cylindrical surface 21a of the housing 20. In other words, the outer case 11 is in a mounting state in which the retainer inner cylindrical surface 21b is sandwiched and elastically held between the retainer large-diameter portion 11c4 and the expanding outer cylindrical surface 11c5; hence, the mounting position of the air-permeable water non-permeable unit 10 within the mounting through-hole 21 is determined by this mounting state.

Accordingly, in a state where the air-permeable water non-permeable unit 10 is fitted into the mounting through-hole 21 of the housing 20 as shown in FIG. 1B, there is almost no compression force acting on the insertion guidance small-diameter portion 11c3 of the outer case 11, and the position of the air-permeable water non-permeable unit 10 within the mounting through-hole 21 is determined by the fitting relationship between the retainer inner cylindrical surface 21b, the retainer large-diameter portion 11c4 and the expanding outer cylindrical surface 11c5. At the same time, the retainer large-diameter portion 11c4 is tightly fitted (fit-engaged) into the large-diameter inner cylindrical surface 21c by an elastic diameter-expanding force, and furthermore, due to the tightly fitting relationship between the retainer large-diameter portion 11c4, the expanding outer cylindrical surface 11c5 and the retainer inner cylindrical surface 21b, an air-tight state can be achieved between the mounting through-hole 21 and the outer case 11. The ventilation-requiring space X inside the housing 20 and the external space outside the housing 20 are communicably connected via the ventilation hole 11a, the air-permeable water non-permeable sheet 13 and the ventilation hole 12a.

In the air-permeable water non-permeable unit 10 of the illustrated embodiment, the outer case 11 is provided with the through-holed base portion 11b on the ventilation-requiring space X side of the cylindrical portion 11c, and the inner case 12 is inserted, from the external space (on the opposite side to that of the ventilation-requiring space X), into the cylindrical portion 11c of the outer case 11. In the air-permeable water non-permeable unit 10, since the through-holed base portion 11b of the outer case 11 faces toward the mounting through-hole 21 of the housing 20 and the retainer flange portion 11d is positioned toward an outward direction (external space) of the housing 20 when the outer case 11 is inserted into the mounting through-hole 21 from the through-holed base portion 11b, the inner case 12 is prevented from falling into the ventilation-requiring space X (inside the housing 20) when the inner case 12 is mounted in the housing 20. Furthermore, in the air-permeable water non-permeable unit 10 of the illustrated embodiment, with the inner case 12 mounted in the mounting through-hole 21 (via the outer case 11) of the housing 20, even if the inner case 12 where to accidentally come out of the outer case 11, no adverse influence on the ventilation-requiring space X side would occur since the inner case 12 falls out in an external space.

In the air-permeable water non-permeable unit 10 of the illustrated embodiment, since the ventilation hole 12a is provided with the large-diameter ventilation hole 12a1 at a side of the ventilation hole 12a that faces the air-permeable water non-permeable sheet 13, and the small-diameter ventilation hole 12a2 at a side of the ventilation hole 12a that faces the external space, a wide effective area of the air-permeable water non-permeable sheet 13 can be obtained by the large-diameter ventilation hole 12a1, while improving a water-resistant effect in which water is prevented from permeating from the external space into the ventilation hole 12a.

In the above-described embodiment, the outer case 11 and the inner case 12 are formed from the same rubber material, however, for example, by forming the inner case 12 from a rubber material having a higher (harder) rubber hardness than that of the outer case 11, the joining (connecting) strength between the outer case 11 and the inner case 12 can be increased.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An air-permeable water non-permeable unit including a rubber outer case, a rubber inner case, and an air-permeable water non-permeable sheet which is sandwiched in between said outer case and said inner case; and
   a housing provided with a mounting through-hole, in which said air-permeable water non-permeable unit is mounted,
   wherein said outer case includes a cylindrical portion, a retainer flange portion extending radially outwards from one end of the cylindrical portion, and a through-holed base portion having a ventilation hole formed therethrough, said through-holed base portion extending radially inwards from the other end of said cylindrical portion,
   wherein said inner case is fitted inside said cylindrical portion of said outer case and is formed as a through-holed cylindrical body including a ventilation hole, said air-permeable water non-permeable sheet being sandwiched between said through-holed base portion and said through-holed cylindrical body,
   wherein said mounting through-hole includes a retainer inner cylindrical surface, which is smaller in diameter than the remainder of said mounting through-hole, at an intermediate portion with respect to an central axis direction thereof,
   wherein said air-permeable water non-permeable unit is inserted into the mounting through-hole with the through-holed base portion of the outer case facing toward the mounting through-hole and the retainer flange portion orientated toward an external position with respect to the housing, and
   wherein said outer case is provided with an insertion guidance small-diameter portion which is not compressed by said retainer inner cylindrical surface and is smaller in diameter than said retainer inner cylindrical surface, and a retainer large-diameter portion which is compressed by said retainer inner cylindrical surface and is larger in diameter than said retainer inner cylindrical surface, in that order in a direction of insertion of said air-permeable water non-permeable unit into said mounting through-hole.

2. The air-permeable water non-permeable device according to claim 1, wherein said mounting through-hole of said housing comprises a large-diameter inner cylindrical surface, which is larger in diameter than that of said retainer inner cylindrical surface, at the fully-inserted side, with respect to the insertion direction of said outer case, of said retainer inner cylindrical surface,
   wherein said retainer large-diameter portion, of said outer case, which is inserted to a fully-inserted position after being compressed by said retainer inner cylindrical surface fit-engages with said large-diameter inner cylindrical surface in a compressed state.

3. The air-permeable water non-permeable device according to claim 2, wherein said mounting through-hole of said housing comprises a tapered inner cylindrical surface at an insertion-opening side of said retainer inner cylindrical surface,
   wherein said outer case comprises an expanding outer cylindrical surface which fit-engages with said tapered inner cylindrical surface.

4. The air-permeable water non-permeable device according to claim 1, wherein a large-diameter inner cylindrical surface which overlaps said retainer large-diameter portion which respect to positions thereof in an central axial direction is formed on an inner cylindrical surface of said cylindrical portion of said outer case, and a large-diameter outer cylindrical surface which fit-engages with said large-diameter inner cylindrical surface is formed on an outer cylindrical surface of said inner case, in a state where said inner cylindrical surface of said cylindrical portion of said outer case and said outer cylindrical surface of said inner case are fit-engaged with each other.

5. The air-permeable water non-permeable device according to claim 1, wherein a large-diameter inner cylindrical surface which overlaps said retainer large-diameter portion which respect to positions thereof in an central axial direction is formed on an inner cylindrical surface of said cylindrical portion of said outer case, and
   wherein a large-diameter outer cylindrical surface, which is larger in diameter in a free state than said large-diameter inner cylindrical surface of said outer case and reduces in diameter upon being fitted in said large-diameter inner cylindrical surface, is formed on an outer peripheral surface of said inner case.

6. The air-permeable water non-permeable device according to claim 4, wherein said inner cylindrical surface of said cylindrical portion of said outer case is provided with a small-diameter inner cylindrical surface (11c2), which is smaller in diameter than that of said large-diameter inner cylindrical surface and formed at one end of said large-diameter inner cylindrical surface, and
   wherein said inner case is provided with a small-diameter outer cylindrical surface which is larger in diameter in a free state than said small-diameter inner cylindrical surface, wherein the diameter of said small-diameter outer cylindrical surface is reduced upon being fitted in said small-diameter inner cylindrical surface.

7. The air-permeable water non-permeable device according to claim 5, wherein said inner cylindrical surface of said cylindrical portion of said outer case is provided with a small-diameter inner cylindrical surface, which is smaller in diameter than that of said large-diameter inner cylindrical surface and formed at one end of said large-diameter inner cylindrical surface, and
   wherein said inner case is provided with a small-diameter outer cylindrical surface which is larger in diameter in a free state than said small-diameter inner cylindrical surface, wherein the diameter of said small-diameter outer cylindrical surface is reduced upon being fitted in said small-diameter inner cylindrical surface.

8. The air-permeable water non-permeable device according to claim 1, wherein said ventilation hole of said inner case comprises a large-diameter ventilation hole at a side thereof that faces said air-permeable water non-permeable sheet, and a small-diameter ventilation hole at a side thereof that faces an external space of said housing, wherein said small-diameter ventilation hole is smaller in diameter than that of said large-diameter ventilation hole.

9. The air-permeable water non-permeable device according to claim 1, wherein said inner case is inserted into said cylindrical portion of said outer case from a side thereof at an external space of said housing.

* * * * *